United States Patent [19]
Obellianne et al.

[11] 3,843,656
[45] Oct. 22, 1974

[54] 2-METHYLAMINO-4'-METHYL-4-PIPERAZINYL-6-CHLORO-5-METHYLTHIO-PYRIMIDINE, SALTS THEREOF, AND PROCESS FOR THEIR PREPARATION

[75] Inventors: Pierre Marie Joseph Obellianne, Paris; Pierre Andre Carbonnel, Eaubonne; Gerard Paul Marie Henri Loiseau, Sceaux; Rene Jean Millischer, Pringy, France

[73] Assignee: Produits Chimiques Ugine Kuhlmann, Paris, France

[22] Filed: Mar. 1, 1973

[21] Appl. No.: 337,222

[30] Foreign Application Priority Data
Jan. 5, 1973 France .................. 73.7206981

[52] U.S. Cl. .................. 260/256.5 R, 424/251
[51] Int. Cl. .................. C07d 57/12
[58] Field of Search .................. 260/256.5 R

[56] References Cited
UNITED STATES PATENTS
2,985,657   5/1961   Janssen .................. 260/256.5 R
3,060,183   10/1962  Clark et al. .................. 260/256.5 R
3,299,067   1/1967   Regnier et al. .................. 260/256.5 R Primary Examiner—Richard J. Gallagher
Attorney, Agent, or Firm—Browne, Beveridge, DeGrandi & Kline

[57] ABSTRACT

The compound of the formula:

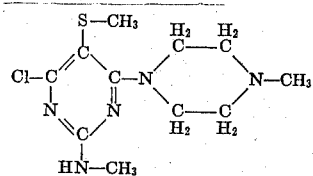

salts of this compound and process for the preparation of the compound which comprises condensing one mole of 2,4,6-trichloro-5-methylthio-pyrimidine with 1 mole of methylamine at a temperature equal to or less than the ordinary room temperature and condensing the 2-methylamino-4,6-dichloro-5-methylthio-pyrimidine thus obtained with one mole of N-methyl-piperazine to yield 2-methylamino-4'-methyl-4-piperazinyl-6-chloro-5-methylthio-pyrimidine and medicaments consisting of or comprising this compound or a pharmaceutically acceptable salt thereof, said medicaments having action on the central nervous system.

10 Claims, No Drawings

2-METHYLAMINO-4'-METHYL-4-PIPERAZINYL-6-CHLORO-5-METHYLTHIO-PYRIMIDINE, SALTS THEREOF, AND PROCESS FOR THEIR PREPARATION

The present invention concerns a pyramidine derivative, a process for its preparation and its use as a medicament.

Pyrimidine derivatives having fungicidal properties are already known.

The present invention relates to a novel pyrimidine derivative which may be used as a medicament on account of its remarkable action on the central nervous system.

According to the present invention there is provided a pyrimidine derivative of the following formula:

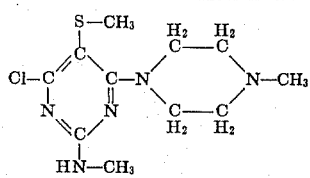

The invention includes the salts of this amino compound with acids.

The invention also includes a process for the preparation of the pyrimidine derivative which comprises condensing one mole of 2,4,6-trichloro-5-methylthiopyrimidine with one mole of methylamine at a temperature equal to or less than the ordinary room temperature and condensing the 2-methylamino-4,6-dichloro-5-methylthiopyrimidine thus obtained with one mole of N-methyl-piperazine. The 2-methylamino-4'-methyl-4-piperazinyl-6-chloro-5-methyl-pyrimidine thus obtained can be converted into a salt if desired by treatment with an acid.

The condensations are advantageously effected in the presence of an agent capable of absorbing the hydrochloric acid formed. For this purpose, one may, for example, operate in the presence of a tertiary base or of an excess of the amine taking part in the condensation.

The condensation with the monomethylamine is preferably carried out at a temperature between 0°C. and 10°C. An alkaline hydroxide may then be chosen to absorb the acid formed. The reaction medium for this condensation preferably comprises a mixture of water and an organic solvent partly soluble in the water. As such there may be particularly mentioned the aliphatic ketones such as for example methylethylketone, diethylketone, methylpropyl or isopropyl ketones.

The 2-methylamino-4,6-dichloro-5-methylthiopyrimidine obtained is isolated from the medium in which it is formed for the purpose of the condensation with N-methylpiperazine. The latter is effected advantageously in an alcoholic medium.

In the following Example which is purely illustrative the parts are parts by weight unless the contrary is stated.

Example (a) Preparation of 2-methylamino-4,6-dichloro-5-methylthio-pyrimidine 184 parts of 2,4,6-trichloro-5-methylthio-pyrimidine are dissolved in 592 parts of methylethylketone at the ambient temperature. Then 250 parts of crushed ice are added and 70 parts of an aqueous 33 percent solution of methylamine are run in over a period of 30 minutes while cooling, if necessary, so that the temperature does not exceed +5°C. The 2-methylamino-4,6-dichloro-5-methylthio-pyrimidine (paraisomer) begins to precipitate partly in a crystalline form from the start of the reaction. 108 parts of a 30 percent solution of sodium hydroxide are introduced over a period of an hour and the reaction medium is allowed to return to the ambient temperature. It is cooled to 10°C., left for 15 hours at this temperature and filtered in order to isolate the precipitate. This is washed on the filter with 50 parts by volume of cooled methylethylketone. The 2-methylamino-4,6-dichloro-5-methylthio-pyrimidine, after crystallisation from ethanol, is in the form of long colourless needles. Purity = 99.9 percent. M.p. 155–156°C.

(b) Preparation of 2-methylamino-4'-methyl-4-piperozinyl-6-chloro-5-methylthio-pyrimidine 45 parts of 2-methylamino-4,6-dichloro-5-methylthiopyrimidine are dissolved in 1,000 parts by volume of absolute ethanol while heating at 70°–72°C. then 60 parts of N-methyl-piperazine are added at this temperature over a period of 10 minutes. The mixture is refluxed for 3 hours and then cooled to about −25°C. and it is filtered at this temperature and the precipitate is washed on the filter with 50 parts by volume of ethanol cooled to −25°C. The 2-methylamino-4'-methyl-4-piperazinyl-6-chloro-5-methylthio-pyrimidine is dried, then recrystallised successively from 100 parts, then 80 parts by volume of ethanol. 36 parts of 2-methylamino-4'-methyl-4-piperazinyl-6-chloro-5-methylthio-pyrimidine are obtained which is present as colourless needles.

M.p. 121°–122°C.

Analysis: for $C_{11}H_{18}N_5SCl$

|  | C | H | N | Cl | S |
|---|---|---|---|---|---|
| Calculated Percent: | 45.91 | 6.26 | 24.34 | 12.34 | 11.13 |
| Found Percent: | 45.95 | 6.24 | 23.83 | 12.42 | 11.34 |

(c) Preparation of the hydrochloride of 2-methylamino-4'-methyl-4-piperazinyl-6-chloro-5-methylthio-pyrimidine 29 parts of 2-methylamino-4'-methyl-4-piperazinyl-6-chloro-5-methylthio-pyrimidine are dissolved in 600 parts by volume of absolute ethanol while heating at the boil. The mixture is cooled and possibly filtered in order to remove traces of undissolved product and, in such a case, the residue is washed with 50 parts by volume of absolute ethanol. 100 parts by volume of normal hydrochloric acid are added to the filtrate with stirring. The hydrochloride slowly precipitates at the ambient temperature and the product is cooled to about 9°C. in order to complete the precipitation. The precipitate is filtered off, washed on the filter twice with 100 parts by volume of anhydrous ethanol heated to 50°C. and dried in an oven at 50°C. 30 parts of the 2-methylamino-4'-methyl-4-piperazinyl-6-chloro-5-methylthio-pyrimidine hydrochloride product are obtained which is crystalline and colourless.

Analysis: for $C_{11}H_{19}N_5SCl_2$

|  | C | H | N | Cl | S |
|---|---|---|---|---|---|
| Calculated Percent: | 40.74 | 5.86 | 21.6 | 21.91 | 9.87 |
| Found Percent: | 40.92 | 5.99 | 21.72 | 21.92 | 10.43 |

Toxicological and pharmacological properties

The acute toxicity of the product according to the invention in the form of the hydrochloride has been determined on Swiss albino mice of the CDl strain and the Sprague-Dawley CD rat, taken orally and intravenously.

The following Table groups the results obtained:

| Method | LD50 mg/kg (3 days) (cumulative quantal method) | |
|---|---|---|
|  | mouse | rat |
| oral | about 200 | about 600 |
| intravenous | about 30 |  |

Its principal pharmacological property lies in its remarkable action on the central nervous system. It manifests itself particularly in an anti-emetic effect, an analgesic effect and an antiserotonine effect. The product also has important peripheral spasmolytic and antiserotonine effects.

The activity of the product according to the invention on the central nervous system has been studied by means of the following techniques: in relation to the antiemetic activity (vomiting from apomorphine) on dogs the technique used was that according to CHEN G. and ENSOR C., J. Pharmacol, exp. Therap., 98, 24 (1950); for cataleptic activity on rats the technique used was that according to COURVOISIER S., DUCROT R. and JULOU L., Psychotropic Drugs, Elsevier Publ. Co. 1957, p.373; in relation to the analgesic activity on mice (phenylbenzoquinone test) the technique used was that according to STEGMUNG E., CADMUS R. and LU G., Proc. Soc. Exp. Biol. Med. 95, 729 (1957); finally for the central antiserotonine activity the technique used was that known as "Head twitch" according to CORNE, S. J. PICKERING, R. W., and WARNER, B. T., Brit. J. Pharmacol., 20, 106 (1963).

The results obtained are collected in the following Table:

| Anti-emetic activity | Cataleptic Activity | Analgesic activity | Anti-serotonine activity |
|---|---|---|---|
| dog, orally ED50 mg/kg | rat, orally AD50 mg/kg | mouse, orally AD50 mg/kg | mouse, orally AD50 mg/kg |
| 0.1 | 65 | 40 | 35 |

The product according to the invention exerts a powerful anti-vomiting activity on the dog taken orally. This effect is double the cataleptic, analgesic and central antiserotonine power on small rodents. The antiserotonine activity of the product has been also shown, at the peripheral level, in the following techniques: serotonine plantar oedema in the rat by the method of THEOBALD W. and DOMENJOZ R., Arzneimittel Forsch., 8, 18 (1958); serotonine bronchospasms by a method derived from that of KONZET H. and ROSSLER R., Arch. exp. Pathol. Pharmakol., 195, 71 (1940); serotonine spasms on the isolated uterus of rats by the method of FANCHAMPS A., DOEPFNER W., WEIDMAN H. and CERLETTI A., Schw. Med. Worsch., 90, 1040 (1960).

The following Table shows the results obtained:

| Serotonine planter oedema rat, orally AD50 mg/kg | Serotonine Bronchospasms Guinea-pig intravenously % inhibition | Serotonine spasms isolated uterus of rats EC50 mg/l |
|---|---|---|
| 150 | 1 mg/kg; −40 % | 0.005 |

The product according to the invention has a peripheral antiserotonine property both in vitro and in vivo given intravenously or orally.

The spasmolytic activity of the product in vivo on the mouse has been studied in the intestinal transit test by the method of JANSSEN P. A. J. and JAGENEAU A. N., J pharm. Pharmacol., 9, 381 (1957). In this technique the product according to the invention has a AD50 of 60 mg/kg taken orally.

THERAPEUTIC APPLICATION

The product according to the invention and its pharmaceutically acceptable salts may be used in human or veterinary therapeutics, in the form of tablets, capsules, gelatin-coated pills, suppositories or injectable or ingestable solutions, in the following cases: vomiting, nausea and migraines of all origins, digestive and other spasms, as well as the various states relevant to a psychotropic treatment. The daily amounts administered may be between 10mg and 200mg of active product.

We claim:
1. The compound of the formula:

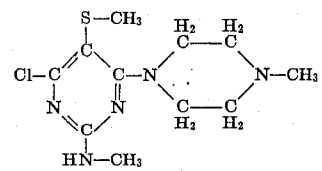

and pharmaceutically acceptable acid addition salts.

2. A salt of the compound claimed in claim 1.

3. Process for the preparation of the compound claimed in claim 1 which comprises condensing 1 mole of 2,4,6-trichloro-5-methylthio-pyrimidine with 1 mole of methylamine at a temperature equal to or less than the ordinary room temperature and condensing the 2-methylamino-4,6-dichloro-5-methylthio-pyrimidine thus obtained with one mole of N-methylpiperazine to yield 2-methylamino-4'-methyl-4-piperazinyl-6-chloro-5-methylthio-pyrimidine.

4. Process according to claim 3 wherein the 2-methylamino-4'-methyl-4-piperazinyl-6-chloro-5-methylthio-pyrimidine is reacted with an acid.

5. Process according to claim 3 wherein the 2-methylamino-4,6-dichloro-5-methylthio-pyrimidine is isolated.

6. Process according to claim 3 wherein the condensation with the methylamine is effected at a temperature from 0° to 10°C.

7. Process according to claim 6 wherein the condensation is effected in the presence of an alkali metal hydroxide.

8. Process according to claim 6 wherein the reaction medium for the condensation is a mixture of water and an organic solvent partly soluble in water.

9. Process according to claim 3 wherein the condensation with the N-methyl piperazine is effected in an alcoholic medium.

10. Process according to claim 3 wherein each of the condensations is effected in the presence of a tertiary base or an excess of the amine taking part in the condensation.

UNITED STATES PATENT OFFICE
CERTIFICATE OF CORRECTION

Patent No. 3,843,656          Dated October 22, 1974

Inventor(s) Pierre Marie Joseph Obellianne et al

It is certified that error appears in the above-identified patent and that said Letters Patent are hereby corrected as shown below:

In the heading, line 30, the foreign application priority data should read--

March 1, 1972      France....................72.7206981

Signed and sealed this 13th day of March 1975.

(SEAL)
Attest:

RUTH C. MASON
Attesting Officer

C. MARSHALL DANN
Commissioner of Patents
and Trademarks